US007263636B1

(12) United States Patent
Buller et al.

(10) Patent No.: US 7,263,636 B1
(45) Date of Patent: Aug. 28, 2007

(54) CIRCUIT-TRENDING SYSTEM AND METHOD

(75) Inventors: Victor Anthony Buller, Grandview, MO (US); Robert Steven Berg, Olathe, MO (US); Jeffrey D. MacLeod, Olathe, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 513 days.

(21) Appl. No.: 10/865,034

(22) Filed: Jun. 10, 2004

(51) Int. Cl.
*G06F 11/00* (2006.01)
(52) U.S. Cl. .................................. 714/47; 702/187
(58) Field of Classification Search .................. 714/47; 702/187
See application file for complete search history.

(56) References Cited

U.S. PATENT DOCUMENTS

| | | | |
|---|---|---|---|
| 6,301,531 B1 * | 10/2001 | Pierro et al. .................. 701/29 |
| 6,327,677 B1 * | 12/2001 | Garg et al. .................... 714/37 |
| 6,691,064 B2 * | 2/2004 | Vroman ....................... 702/183 |
| 6,795,935 B1 * | 9/2004 | Unkle et al. .................. 714/37 |
| 6,845,306 B2 * | 1/2005 | Henry et al. .................. 701/29 |
| 6,975,963 B2 * | 12/2005 | Hamilton et al. ........... 702/182 |
| 7,131,030 B2 * | 10/2006 | Gilstrap et al. ............... 714/25 |
| 2002/0091972 A1 * | 7/2002 | Harris et al. .................. 714/47 |
| 2003/0115508 A1 * | 6/2003 | Ali et al. ....................... 714/43 |

\* cited by examiner

*Primary Examiner*—Marc Duncan

(57) ABSTRACT

A method for trending the functionality of the circuits of a switch, router or other piece of equipment. The method accesses error logs for the equipment. These error logs are normally maintained in a data base associated with the piece of equipment. Next, a historical report is generated. This historical report comprises historical information regarding the operability of at least one circuit. Finally, the historical information in the report is used to predict the future operability of the circuit, or circuits.

37 Claims, 5 Drawing Sheets

REPORT

| CLLI | PORT | ERRORS | 12/1/03 MON | 12/2/03 TUE | 12/2/03 WED | 12/4/03 THUR | 12/5/03 FRI | 12/6/03 SAT | CLIENTS |
|---|---|---|---|---|---|---|---|---|---|
| AKRNOHIJBBY | ao3d0071018 | pcv_febe | 0 | 14 | 14 | 14 | 14 | 15 | Acme, Inc |
| AKRNOHIJBBY | at3d021004 | cv_febe | 12 | 40 | 36 | 44 | 28 | 78 | Acme, Inc |
| ATLNGAUSBBY | at3d021002 | sefs_picp | 192 | 192 | 192 | 192 | 192 | 192 | Acme, Inc |
| EKRGMD92BAK | aocd0050004 | puas | 3 | 1 | 11 | 6 | 2 | 6 | Acme, Inc |
| EKRGMD92BAK | acod1050004 | puas | 3 | 1 | 13 | 5 | 1 | 6 | Goldman |
| EKRGMD92BBW | a03d0011016 | paus | 192 | 192 | 192 | 192 | 192 | 192 | Goldman |
| EKRGMD92BBW | ao3d1011016 | paus | 192 | 192 | 192 | 192 | 192 | 192 | Goldman |
| EKRGMD92BBW | at3d021602 | cv_febe | 48 | 60 | 501 | 24 | 40 | 48 | Jones |
| EKRGMD92BBW | at3d061226 | febe | 1440 | 1440 | 1440 | 1440 | 1440 | 1440 | Smith |

FIG. 4

CIRCUIT-TRENDING SYSTEM AND METHOD

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates generally to the field of monitoring telecommunications equipment. More specifically, the present invention relates to the field of projecting the functionality of telecommunication switches over time.

2. Description of the Related Art

Telecommunications systems use a number of circuits. Some examples of circuits in use are fiber optic, DS3, T1, or any other kind of circuitry connected into a network.

Circuits fail for a variety of reasons and in different ways. First, the circuit could fail as the result of some sort of sudden unintended event. One example of this is a technician tripping over and dislodging a cable, among other similar types of random events. Sudden unintended failures like this are difficult, if not impossible to predict or prepare for. Another example of a sudden unpredictable failure might involve bumping of a buffer card which can cause errors.

These types of mishaps cannot be predicted with any certainty.

A second kind of circuit failure, however, is more predictable. This type of failure is more of a slow death. Circuits of all kinds degrade in service over time. Taking fiber optics as an example, the fibers may become dirty, causing them to gradually fail. Other kinds of circuits will fail over time as well for a variety of reasons. When a circuit fails due to gradual degradation, these circuits will go from being operational all the time, to being operational most of the time, to being operational only some of the time, and then being completely defunct.

Unexpected circuit failures are problematic. When a circuit fails unexpectedly, a system may have to be taken down for days in order to fix the circuit, or circuits, involved. This is costly. It also angers customers of the service provider. Nothing angers customers more than when they are unable to complete tasks because of some kind of system breakdown. These customers may become so bothered that they will terminate a business relationship. This can cost the provider not only lost business, but also damaged reputation.

There is presently no good way to predict gradual circuit failures. This is because most equipment, e.g., telecommunications switches, usually have alarms which are triggered only after a circuit fails at some extremely high threshold level. A craftsperson may detect a few alarms when in fact thousands have reported on the network element. A few alarms are often not noticed or ignored, particularly when they report sporadically.

This lofty error requirement is designed to avoid false error reports. All error reports are not indicative of a bad circuit. There can be other explanations for errors, such as service maintenance, etc. Thus, an error log might include 400 errors when there is actually nothing wrong with the circuit. Systems administrators do not want to repair circuits that are not bad, or waste time checking out faulty reports. Thus, the threshold has been set higher to avoid false reports by these still good circuits.

This has its costs, however. An elevated threshold prevents the administrator from gleaning any helpful knowledge from the errors detected which fall below the alarm level. This under-the-threshold error information is maintained in logs in an internal database associated with the piece of equipment. There it remains, unused, until it is scheduled for deletion because there is no way in the prior art to adequately use these logs.

SUMMARY OF THE INVENTION

The method of the present invention takes advantage of the information in the error logs which normally would fly under the radar, so to speak, of the typical system alarms. These alarms tend to operate at high error thresholds. The under the radar error information is monitored for functionality. By trending this functionality, the user is able to predict the functionality of circuits in a circuit network.

This is done by following three fundamental steps. First, log data regarding the functionality of at least one circuit, but normally numerous circuits, over a period of time is obtained from the equipment's (e.g., switch's) error logs. These error logs are normally maintained in a data base associated with the piece of equipment. Second, a historical report is generated. This historical report comprises historical information regarding the operability of at least one circuit. Third, the historical information in the report is used to predict the future operability of the circuit, or circuits.

BRIEF DESCRIPTION OF THE SEVERAL VIEWS OF THE DRAWINGS

The present invention is described in detail below with reference to the attached drawing figures, wherein:

FIG. 4 is a table which is an example of the report generated pursuant to the processes of the present invention.

DETAILED DESCRIPTION OF THE INVENTION

Figure 1:
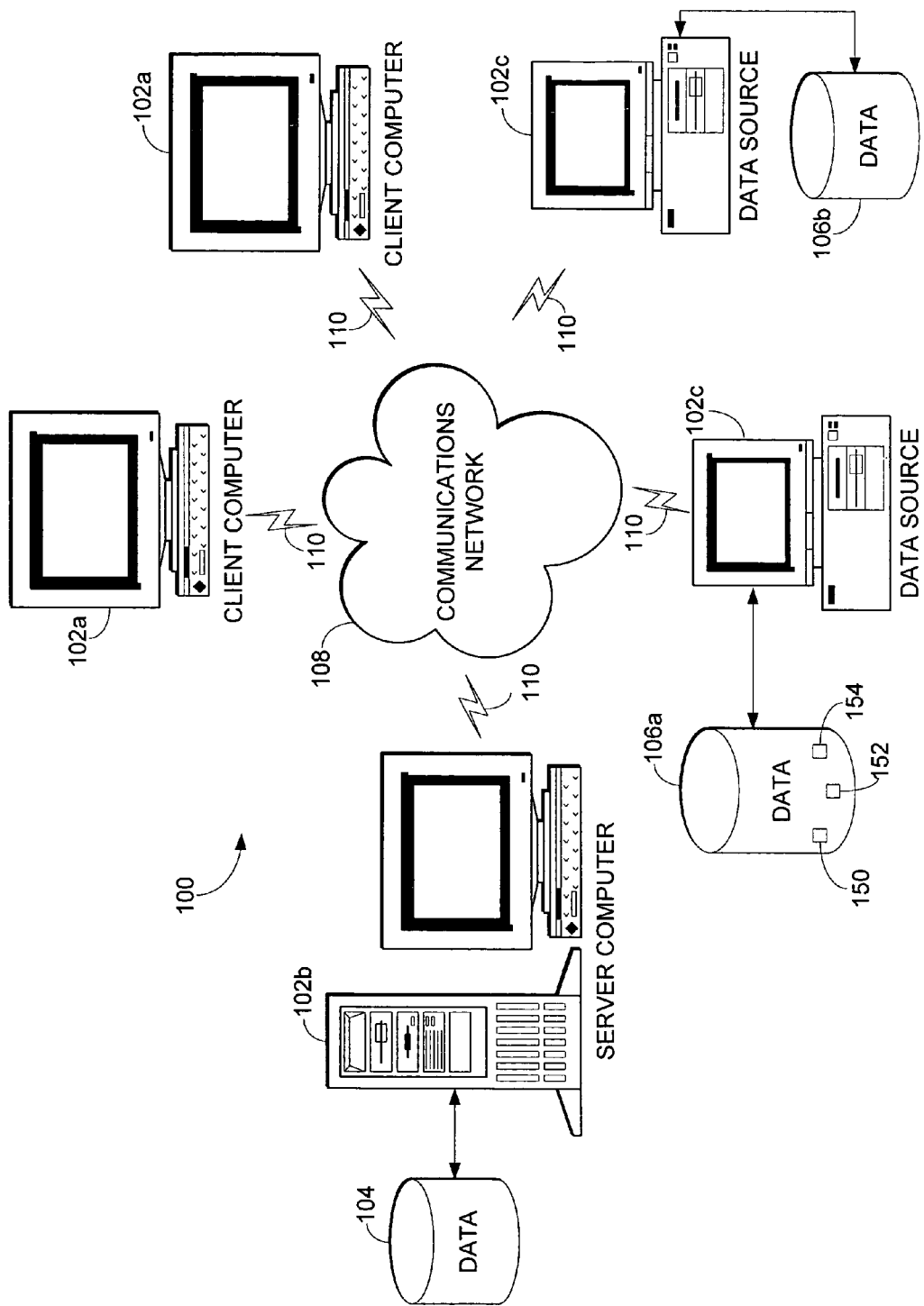
FIG. 1 is a schematic representation of one embodiment for a system in which the method of the present invention could be used.

The present invention provides a system and method for generating a workable error report which will enable the user to predict circuit failures in a piece of computing equipment, e.g., a switch or router. It enables the user to identify gradually failing circuits before they are actually completely defunct. This enables the administrator to properly schedule maintenance without shutting down the system at an unscheduled time.

With the prior art systems, the user would not recognize problems with a circuit until that circuit reached a certain level of failure. Alarms typically are set to catch circuits that are failing thousands, possibly millions of times per day. The system of the present invention enables the user to detect the more subtle intermittent failures which are characteristic of a gradually failing circuit.

Gradually failing circuits are nice to identify early so that they can be promptly repaired. Early repairs of these circuits benefit the system. Each degraded, slightly malfunctioning circuit in a switch or router costs the system valuable processing time. This is because additional processing is required to circumvent the circuit. When you add up multiple degraded circuits in a piece of equipment, its overall functionality can be significantly impaired.

A perhaps more important advantage in the process of the present invention is that the customer will oftentimes never be aware that any failure has occurred whatsoever. Customers usually only notice failures when they are complete, or in other words, when a particular circuit is completely defunct and triggers an alarm. Because the process here detects the errors before they reach the normal thresholds, a service provider may quietly correct the problem before it is detected. The impression left is one of maintenance rather than repair.

The present invention enables the system administrator to identify these failing circuits before they cause major problems. This is done by monitoring trends in the functionality of the equipment's circuitry. Switches and routers have error logs which are maintained chronologically in a database associated with the equipment. The method of the present invention retrieves this error data from the equipment for different intervals. The data is then delimited to create a delimited data set. After the data is delimited, a new data base is populated with the delimited data set. A script then accesses the new data base and generates a report. The report will typically be emailed to a system administrator for analysis. The report shows an error total for each interval for each circuit. The administrator may then analyzing this report to determine functionality trends in said equipment.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein and wherein.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including handheld devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The terms included herein should be interpreted broadly and liberally to the extent allowed the meaning of the words offered in the above-cited reference. For example, whereas some distinguish the World Wide Web (WWW) as a sub-component of the Internet, "web"—as used herein—should not be construed as limited to the WWW. Rather, "web" is intended to refer generally to the Internet and/or is related subnetworks and subcomponents.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

The term "circuit" when used herein is not to be limited to any particular kind of circuit, such as an electrical or optical interconnection. Instead, the term is intended to include any kind of path that forms a passageway for some kind of energy, matter, information, inter alia. The term should be interpreted in its broadest sense, rather than being trimmed to some more specific traditional meaning.

FIG. 1 illustrates an exemplary network environment 100 in which the present invention may be wholly or partially employed. Of course, actual network and database environments can be arranged in a variety of configurations; however, the exemplary environment shown here provides a framework for understanding the type of environment in which the present invention operates. The network may include client computers 102*a*, a server computer 102*b*, data sources 102*c*, and databases 104, 106*a*, and 106*b*. The client computers 102*a* and the data source computers 102*c* are in electronic communication with the server computer 102*b* via communications network 108, e.g., an Intranet or the Internet. Client computers 102*a* and data sources 102*c* are connected to the communications network by way of communications interfaces 110. Communications interfaces 110 can be any one of the well-known communications interfaces such as Ethernet connections, modem connections, and so on.

Server computer 102*b* provides management of database 104 by way of database server system software. Server 102*b* acts as a storehouse of data from a variety of data sources and provides that data to a variety of data consumers.

In the example of FIG. 1, a variety of data sources provide the data to the network 100. The data sources may be any number of devices that have the ability to store or generate data. For example, a data source 102*c* may be a telecommunication switch or router. The data sources 102*c* communicate data to server computer 102*b* via communications network 108, which may be a LAN, WAN, Intranet, Internet, or the like. The data sources 102*c* may store data locally in data files 106*a*, 106*b*, which may be relational database servers, excel spreadsheets, text files, or the like. For example, database 106*a* shows data stored in text files 150, 152, and 154. The data provided by data sources 102*c* may be combined and stored in a large database such as a data warehouse maintained by server 102*b*.

Client computers 102*a* that desire to use the data stored by server computer 102*b* can access the database 104 via communications network 108. In one embodiment, Client computers 102*a* may request the data by way of SQL queries (e.g., SELECT statements) on the data stored in database 104.

Figure 2:
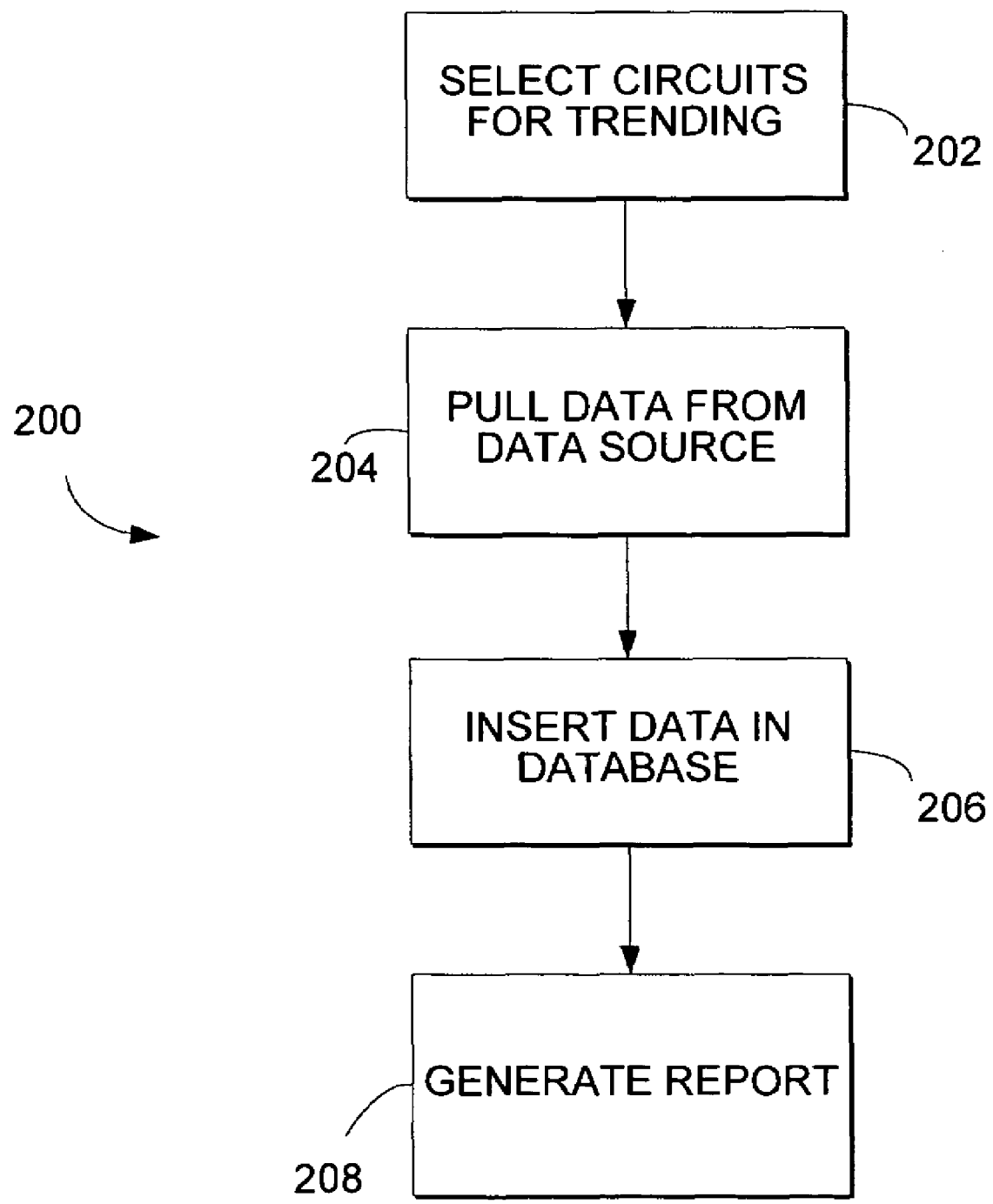
FIG. 2 is a flow chart showing, more generally, the process of the present invention.
Figure 3A:
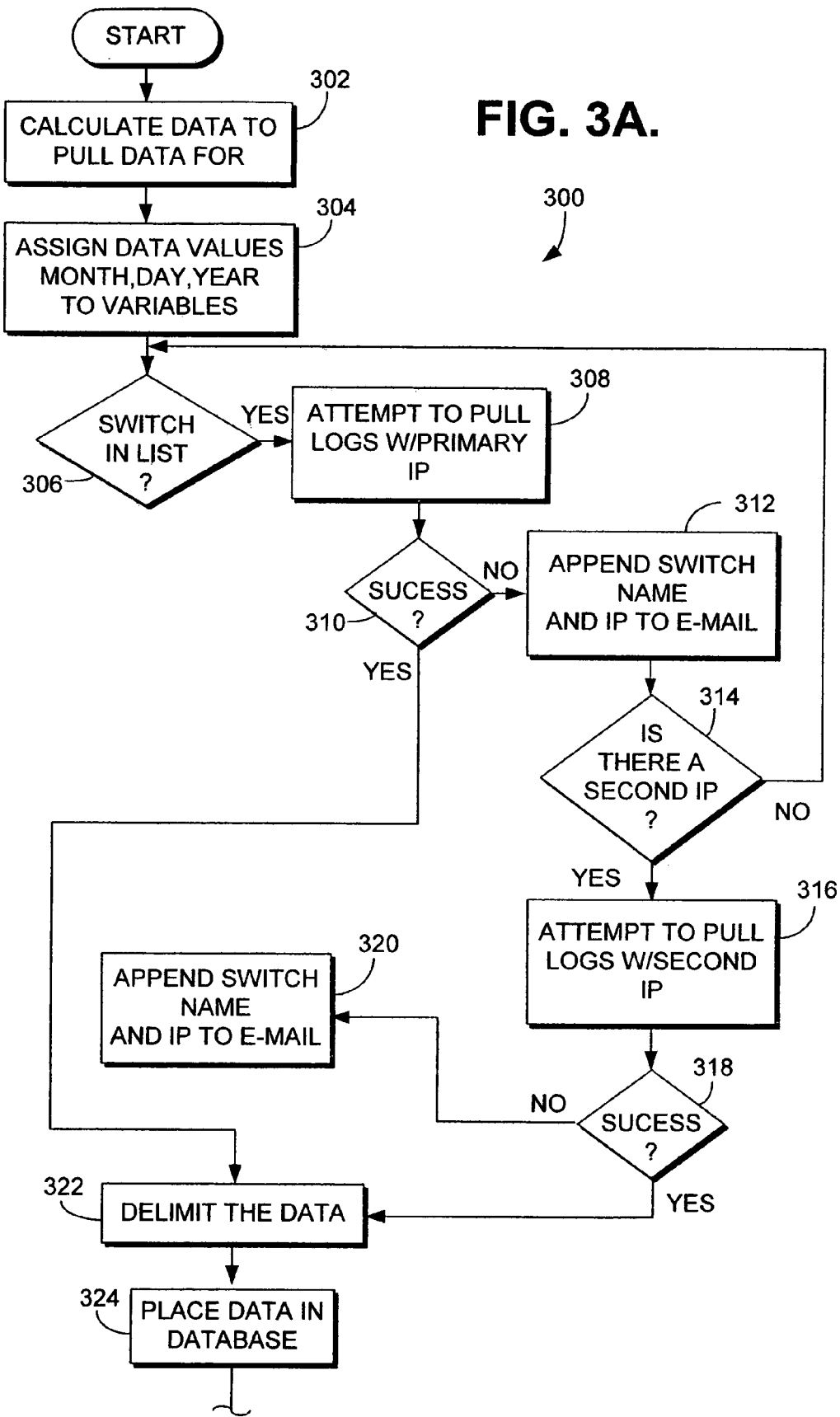
FIGS. 3A and B are flow charts showing, more specifically, the process of the present invention.

The method of the present invention is shown generally in FIG. 2 and more specifically in FIGS. 3A and B. The method functions in the system disclosed in FIG. 1. Referring first to FIG. 2, we see that the method of the present invention involves a first general step of selecting test logs to be trended, step 202. This step involves selecting (i) at least one circuit, but most likely a plurality of circuits for testing, and (ii) selecting intervals in the past (e.g., a series of dates) to be tested. For this first step 202, the administrator will most likely have some particular circuits from the equipment to be tested in mind which needs to be tested. The particular intervals may be routinely run as part of an automatically scripted routine (e.g., always run the last seven days) or can be selected by the user as desired.

After selecting the circuits and intervals in step 202, the second step 204 involves pulling the data from the data source, e.g., source 106*a* of FIG. 1. This involves retrieving error data from the logs in the equipment for the specified circuits and intervals selected. This data might be included in log files 150, 152, and 154. Devices such as switches and routers automatically same tremendous amounts of error data in data logs in an associated data base. This error log data base serves as the data source here. Through processes disclosed in more detail hereinafter, the specified error data may be accessed from these logs.

Once the selected error data has been pulled from the data source, the data is populated into a receiving database as shown in third step 206. This step involves the use of a program which includes a set of instructions related to a desired database population in the receiving data base. The instructions include information associated with the data source and a database to be populated. The data source is referenced to identify data to be placed in the database, and an insertion command that incorporates the data is created. The insertion command is provided to the database, whereby the identified data is thus input into the database. Optionally, a new database may be created in accordance with the instructions. Also, the insertion command may incorporate operations to be performed upon the input data by the database. More details regarding populating step 206 are discussed in commonly owned U.S. patent application Ser. No. 10/822,381, filed Apr. 12, 2004, with the named inventor Victor A. Buller, the entire contents of which are herein incorporated by reference.

A fourth step 208 disclosed in FIG. 2 involves generating a report. This report includes the historical circuit-error information retrieved from the equipment. The error information is then laid out chronologically so that it may be analyzed. This is accomplished using the data which has been populated into the receiving database 106*a* in step 206. The report generated may be analyzed by a user to determine trends indicative of future circuit functionality.

Figure 3B:
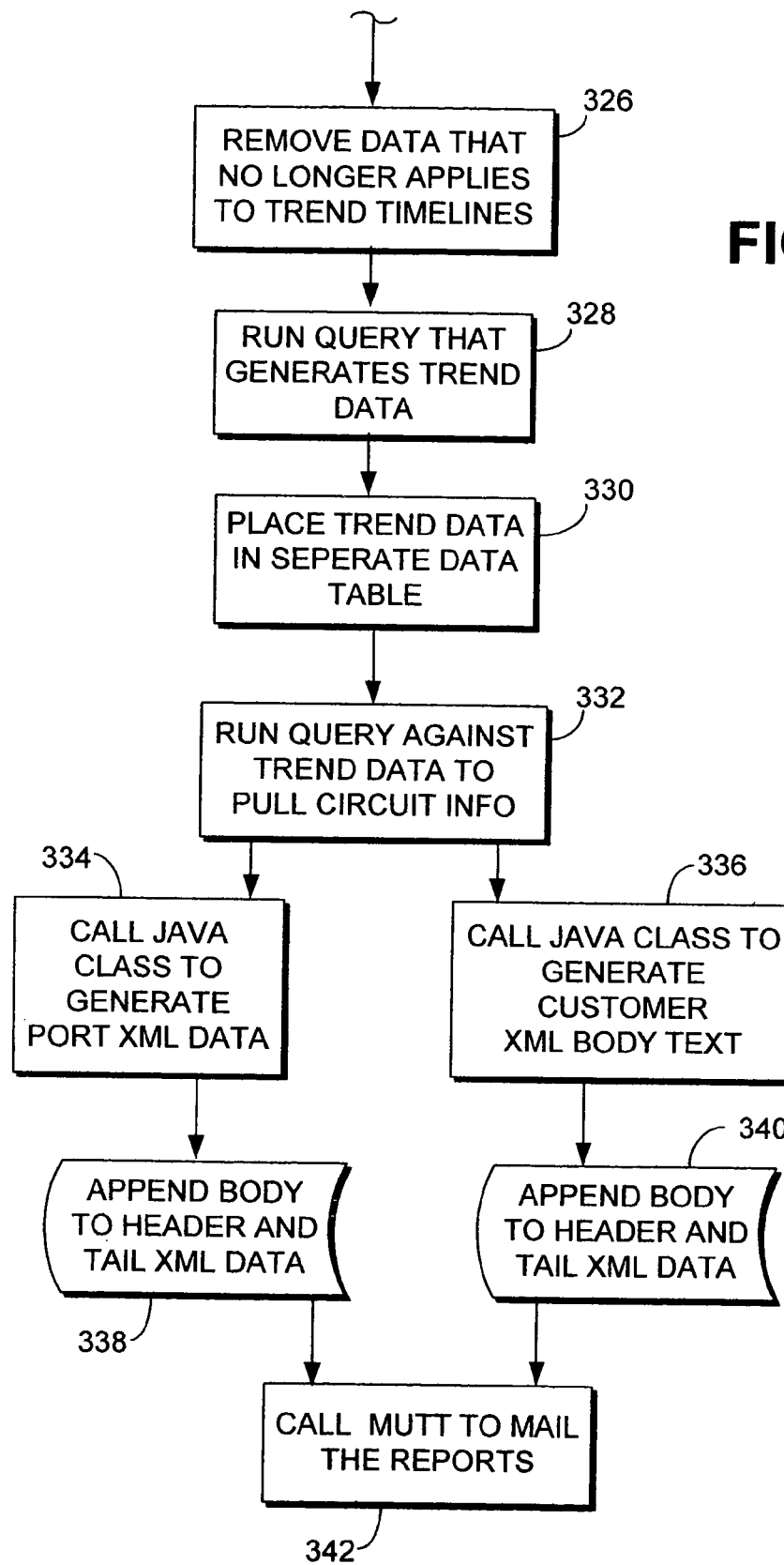

The details regarding this process are disclosed in FIGS. 3A and 3B. The present invention involves the use of a master script. In the overall scheme of things, the Korn Shell script is the master script. It runs all the other programs used. For example, in one embodiment of the present invention, programming modules such as AWK, SED, EXP, Text2Database, and SQL will be used. The Korn Shell script is what accesses these modules and instructs them. AWK, SED, EXP, Text2Database, and SQL are all programming modules are all used as part of the method of the present invention. All but Text2Database will be known to one skilled in the art.

Referring first to FIG. 3A, the first step 302 is to select the dates to pull data for. This step will simply involve selecting a date, or most likely several dates in the past for which the process will be run. In many instances the dates selected will be the dates for the preceding week. For example, if this process is run on a Friday, data could be pulled for the days Saturday through Thursday immediately preceding that Friday. In one embodiment, Korn Shell scripting is used to accomplish this step, as well as to serve as the master program for running the process of the present invention.

Korn Shell scripting is done in Korn Shell language that will be known to those skilled in the art. Korn Shell language was initially developed by David G. Korn at AT&T Bell Labs. It is an interactive command language. It provides access to many systems, including UNIX systems from a particular computer, or many computers on which it is used. It is a high-level language. Though Korn Shell scripting is used in the preferred embodiment of the present invention, it is important to note that other scripting languages such as Bourne Shell scripting, or C shell scripting could be used as well. Additionally, other programming languages and techniques could be used to accomplish the same ends as disclosed here. The high-level Korn Shell language has been used here because it is much more easily readable than low-level codes such as "C." Additionally, scripts like Korn Shell do not have to be compiled. This enables changes to be made more rapidly. Finally, Korn Shell scripts when used with UNIX is a good combination because numerous powerful programming tools (like the modules listed above) are available which can be linked together to create a desired programming result in very little programming development time. The execution of scripts is typically slower than that of compiled programs, but when used for the purposes such as that disclosed here for the present invention, the run times will be insignificantly different, and do not diminish the development reduction benefits afforded.

With respect to step 302, Korn Shell scripts which are able to subtract days from a date are available in the art, and these scripts will be known to those skilled in the art. One example of a useable script was found at http://unix.about.com/library/weekly/aa070901a.htm and is apparently authored by "Kathy R." This type of conventional script has been used in this step of the invention. This type of scripting is necessary because the desired date will not be the date the test is run. Rather, it will be some date in the past. Past data is needed in order to generate a historical record. Perhaps the days immediately preceding, or maybe a plurality of days further in the past.

With this time-subtracting script the user will, in step 304, assign date values to variables. This will include the month, date and year for which the test is to be run. This may also involve running the script for multiple dates, or intervals in the past. The reason the date subtracting script must be used is that the user will not want to pull error data for the date, or including the time period in which the test is run. This is because the testing will not be complete for that interval. Rather, the interpretation will be done on data present in past intervals.

The script then either includes or references a list of switches, routers or other devices which the user wishes to pull error data from for analysis. Then for each switch in the list, as can be seen in step 306, an attempt will be made to pull logs, e.g., files 150, 152, and 154 of data base 106a which maintains the error logs for data source 102c, by accessing a primary IP/port as in step 308. In step 310, if the primary IP/port fails for some reason, e.g., because of use by another party, malfunction, or for some other reason, an e-mail will be transmitted. This email will include the switch name and primary IP/port through which access was denied. With respect to the actual communications conducted with the switch (or other device) as discussed in steps 306 through 312, a programming module commonly known as Expect or "EXP" will be used. EXP is used to do the communicating with the equipments software in a manner that will be readily apparent and known to those skilled in the art.

If the attempt to pull data through the primary IP/port is not successful, an attempt will be made to pull logs through a secondary IP/port on the switch. Switches, as well as other similar computing devices, oftentimes will be provided with a second IP address through which communications may be made in the event of the primary IP address being busy or failing. In this case, the managing Korn Shell script will cause a secondary IP address to be accessed—if there is one—as in step 314. If there is a second IP address, step 316 provides that an attempt will be made to pull logs through the second IP address. At step 318 a determination will be made as to whether access through a second IP address is possible. If not, just like with the failure to access the primary IP address, an e-mail will be sent to a system administrator, as in step 320, informing him or her of the switch name and secondary IP/port which have failed. Again, with respect to steps 308, 310, and 312, steps 314, 316, 318, and 320, the communicating required will be done using EXP in a manner which will be within the working knowledge of one skilled in the art. The management of the process is handled by the managing Korn Shell script.

The reason the e-mails of steps 312 and 320 are necessary is so that the system administrator is not given the impression that the switch tested is clean, or, in other words, that it had no error messages, when this silence may instead be due to failure to get into the switch through its primary or secondary IP/ports.

If initially a successful attempt is made to pull logs from the primary IP address (step 308) or if later a successful attempt to pull logs is made (step 316), the data pulled from the error database for the particular piece of equipment will be delimited, as in step 322. This delimiting is done using two programming modules known as AWK and SED. The script uses these modules to separate and delimit the data in a manner which will be known to those skilled in the art. Once AWK and SED have been run in step 322 to separate and delimit the data, the user will have data which can be downloaded into the database as disclosed in step 324.

In step 324 a Java launch class is called to place the data into a receiving database. This novel process has been developed specifically for the method of the present invention. Computer source code written in the Java™ programming language is utilized. Even though Java™ is used here, any number of programming languages are appropriate for use with the instant invention.

As will be known to one skilled in the art, all objects in the Java™ programming system belong to a class, which can be thought of as a category of like objects which describes the characteristics of those objects. Each object is created as an instance of the class by a program. In one embodiment of the present invention, a "Launcher Class" is created to define the pertinent parameters associated with a database population and to create required objects. The Launcher Class is built only on a per need basis. This class may be referred to as the client code because, as will be understood by those skilled in the art, this code is utilized by a user to set parameters for a database population. Those skilled in the art will further recognize that the operations of the Launcher Class may be appropriate for a graphical user interface (GUI), which allows a user to input the required parameters more quickly and easily.

This method creates an instance of the Text2Database class. As will subsequently be discussed, this class is an object that contains the values and methods needed to perform the data insertion actions.

Next, a data source is defined. E.g., data source 102a might be targeted. As will be appreciated by those skilled in the art, any number of data sources are acceptable for use with the instant invention. The data in the source should be organized in a consistent manner so that a computer program can read the data as discrete records.

Next, a determination is made whether a new destination database should be created in which to store the data. If a new database is needed, then one will be created. If not, the name of the existing database will be identified. A similar determination is then made for the database table in which the data should be stored. If a new table is needed or if an existing table needs to be altered, this will be done by the process. If the desired destination table is in existence, it will be identified by the process.

Next, the database and database tables are created. To do this, two additional classes are initiated—one for creating databases and one for creating tables. As will be understood by those skilled in the art, these classes may be tied to the Text2Database Class as a package. This package "family" could be called in the Launcher and each class in the package would be accessible to each other.

Next, the method creates an instance of a CreateDatabase class object that includes values associated with the desired database. Such actions may be performed by a database creation module. Thereafter, a method is called to open a connection to the appropriate database type (i.e. Oracle, MySQL, Dbase, etc.). This method may be overloaded, which would allow for the database to be located on a different machine than the program.

In the next step, the data base is built. This is done using SQL commands.

The creation of or alteration of tables in the database is performed by a table creation module. An instance of a CreateTable.class object is created which identifies the table to be built in the specified database. A method to create the tables is then utilized, and a method to declare table fields and parameters is called. This method may be overloaded, meaning that different method signatures exist. This makes it possible for the method signature to include a database location other than where the program resides. Also, table fields may be populated by placing database commands into the fields. For example, date or sequencing commands may be placed into the created table.

Table fields are then identified. Such identification may be as elements of an array and the fields should correspond to the table fields in the identified table. The user may place data into the fields. For example, a table may include a date field. This date field may be automatically populated by the database using database functions. Such action eliminates the time and expense associated with importing this date value from the external data source.

A user may then specify functions in the Launcher Class that are to be applied to elements of the data. As will be discussed in relation to the MyFunction method, a user may desire the use of functions in relation to the database population. These functions, to be performed by the database upon the data insertion, may re-format existing data, disregard data, or may cause additional data to be generated.

The method allows for the user to set various optional parameters. These constraints may include a user name, a password, a delimiter associated with the data records in the source, a minimum record size, and a maximum record size. Optionally, default values for each of these parameters may be included with the Text2Database Class. These values are communicated to the Text2Database Class.

Those skilled in the art will recognize that the Text2Database Class need not be altered for a given database population but may remain static while being supplied the appropriate parameters by the Launcher Class. The object values set by the Launcher Class are assigned to the appropriate variables in the Text2Database instance created. Any object values required by the Text2Database Class that are missing are set to a default. As previously mentioned, this Java object is disclosed as an example, and a variety of programming techniques may perform the functionality disclosed.

Next, the method receives the data source location, the destination database name, and the array of table fields. The method considers the first record in the data source, e.g., 150. While such records exist, the next record in the data source is buffered; each field in the record is read and assigned to a temporary array referred to as a "tokens array." The method may include operations to check the data being read in to verify that it is the desired record and not unwanted data.

With one of the data records stored in the tokens array, functions defined in the Launcher Class must be considered. For example, a user may desire to trim a record. The Launcher Class code may include the call T2D.myFunction (Trim(0,3,field[6])), where field[6] is the tokenized record field that the method myFunction(string) will be handling and where Trim( ) is the appropriate database command for the specified database. For example, the value in the token field[6] may be "1234_Port." In the myFunction method, field[6] is converted to Trim(0,3, 1234-Port). This function is placed in the database where the trimming of the data record is accomplished.

Then a connection to the database is made, and an insertion command is constructed. As will be understood by those skilled in the art, the commands must be specific to the database being utilized. However, different classes may be included within the Text2Database class to handle the various commercially available databases. The insertion command is build by utilizing the command syntax of the database being utilized. For example, an insertion command may specify the table name, the columns where the data will be placed, and the values to be inserted into the record. For example, the table fields may be declared as follows: String field[ ]=new String[5]; field[0]="fldCLLI"; field[1]="fldDate"; field[2]="fldTime"; field[3]="fldAlarm"; field[4]= "fldLUType". A sample record delimited with spaces may be: DATA0 DATA1 DATA2 DATA3 DATA4. Accordingly, the resulting insertion command may read: INSERT INTO tbl334 (fldCLLI, fldDate, fldTime, fldAlarm, fldLUType) VALUES ("DATA0", "DATA1", "DATA2", "DATA3", "DATA4", "DATA5"). The insertion command is communicated to the database, such the database is populated and the operations are dynamically performed by the database. Then the connection to the database is closed. Next, a determination is made whether unconsidered records remain in the database. These steps are repeated for each record in the data source.

Thus, all the records have been considered, all connections and files are closed, and a database containing the data has been created, and step 324 is completed.

The results database is created as follows. First, a resource with data is identified. As will be appreciated by those skilled in the art, a wide variety of resources and data may be used with the present invention. For example, the data may also come directly from a resource such as a telecommunication switch or may be drawn from another storage location such as a server.

Next, a database creation module is identified. A database creation module may be any set of computer code which is utilized in database creation. The functionality to create a database is well known in the art and generally involves generating commands such as SQL commands. According to one embodiment of the present invention, a set of database creation modules are provided. Each of these modules may correspond to a commercially available database and may include database commands specific to that commercial database. Table creation modules may also be identified. As will be understood by those skilled in the art, these modules create the database tables and fields. Further, the table creation modules may generate database commands which instruct the database to populate a field in the database. For instance, a date stamp may be placed in a selected field by the table creation module. Then, the database creation command is executed to create an instance of the desired database.

After an instance of the desired database has been created, the data is pushed into the created database. As previously discussed, an insertion command may incorporate the data to be pushed into the database. As will be understood by those skilled in the art, the insertion command directs a database to insert a set of data into the database, and database is thus populated according the values and functions embedded in the insertion command. The insertion command may be created external to the database and be communicated to the database, or the insertion command may be built within a database program and then be utilized by the program. Because the insertion command embodies the desired data and the desired formatting and functionality, the insertion technique of the current invention efficiently is able to push data into the database without the need for timely additional data interactions.

Now that the Text2Database has been run, and the database populated, the process will be ended for each switch in the list.

FIG. 3B begins the process of manipulating the populated data for trending purposes. It is then time, as in step 326, to remove data that no longer applies to the trend timeline. This is done by making an SQL query. This step moves the process from retrieving the data and placing it in the database, to actually preparing the data for the trending process. By eliminating the data that no longer applies to the trend timeline, the size of the files required for data storage will be greatly reduced because the voluminous irrelevant data has been eliminated.

In step 328 a second SQL query is used to generate trend data from the remaining data (that which was not removed in step 326). This will be the circuit information for each port reported in that particular trend data set which has already been delimited. Thus, it may be used to accomplish the trending objectives. A temporary copy of the trend data will then be made so that it may be used for modeling. E.g., by generating a spreadsheet—or otherwise model the error history for the circuits being historically modeled.

In step 330, the trend data is placed in a separate table as a result of an SQL query. This query, in step 332, will then be run against the trend data to pull circuit information.

After step 332, the process is divided in two. In one prong of the process, step 334, the script will call a Java class to generate port XML body text. XML is an extensible mark-up language, the likes of which will be known to those skilled in the art. It is recognizable by Excel and other programs.

This will be followed by step 338 in which the body, header and tale XML data will be appended to the table for the port report text components.

In the other prong of the process, beginning with step 336, a Java class will be called to generate customer XML body text. This will include customer information such as the customer name for each circuit, etc. This information may ultimately be useful in matching up trended circuits with particular clients of a service provider. Next, in step 340 the body, header and tail XML data are appended.

After the port and customer information is processed in both forks of the process (represented by steps 334 and 338 versus steps 336 and 340, respectively) the created reports will be e-mailed to the appropriate system administrators by calling up a process known to those skilled in the art as mutt. Mutt is a file browser. It is specialized for browsing email. It has tools for assembling email, which is what it is used for here. It is simply a mail handling process which will be known to and useable by those skilled in the art for creating the emails required here. Thus, one generation of error reports will be emailed to a system administrator for trending purposes.

FIG. 4 shows a typical table which would be generated as the result of the table-generating process represented by steps 334, 338, 336 and 340 of FIG. 3B. Referring to the FIG. 4 table, we see that it includes at its left-most column a number of device numbers underneath the heading "CLLI." Beneath the header, it can be seen that different devices are recited. For example, "AKRNOHIJBBY," and "ATLNGAUSBBY," are each different devices. Most likely switches.

In the second column underneath the heading of "Port" are a number of circuit identifiers. For example, circuit ao3d0071018 is a circuit within switch "AKRNOHIJBBY." Similarly, circuit aocd0050004 is a circuit within device number "EKRGMD92BAK."

In the third column from the left, is an identifier which informs the administrator of the nature of the errors reported. For example, the appearance of "pcv_febe" is indicative of a path code violation far end block error. "cv_febe" indicates code violation far end block errors. "sefs_plcp" suggests a severely errored framing seconds physical layer convergence protocol. "puas" indicates the occurrence of one or more line failures per second. Other error identifiers are also used indicating other types of errors.

The next six columns in the report each relate to the number of error messages received within the particular interval setup. For example, with respect to the first circuit in the report, identified by ao3d0071018 the report shows that on Dec. 1, 2003 there were zero errors reported, but on the next four days (Dec. 2-5, 2003) there were 14 errors reported each day. Thereafter, on the sixth day, Dec. 6, 2003, 15 errors were reported. As can be recalled from the disclosures above, this test would most likely have been run on Dec. 7, 2003 in order to obtain historical information on the prior six days.

In interpreting the reports, random fluctuations in the number of errors may indicate that a particular circuit is having problems in terms of degradation. Examples may be seen in FIG. 4. Referring to the figure, we see that port "at3d021602" on device number "EKRGMD92BBW" displays an irregular error pattern. On Monday, Dec. 1, 2003, the circuit shows 48 errors. Tuesday the number of errors increases slightly to 60. Wednesday, the number of errors explodes upwards to 501. Then, on Thursday, the count is back down to 24. The Wednesday spike in error count, coupled with the surrounding data, might be indicative of a deteriorating circuit and warrant repair, or at least continuing to monitor the particular circuit for future analysis.

You will also observe that numerous circuits on the table show a consistent error number of "192" on the table. This repeated, consistent error count is possibly indicative of an administrative problem. For example, the particular circuit may have been intentionally disconnected, but has never been properly removed from the management system. This means the circuit is still soaking up valuable processing time. The method of the present invention helps identify this type of problem so that the disconnected circuits can be properly removed. This type of problem would not be noticed but for the below the radar, so to speak, technique of the present invention which is able to detect trends in data which would conventionally be ignored by the conventional device warning systems.

The final column of the table of FIG. 4 includes the customer information. More specifically, this column identifies the client served by the particular circuit. This may be important for the administrator in order to properly service the companies clients. For example, with respect to the possibly failing circuit at3d021602 associated with device EKRGMD92BBW, the system administrator would know that the circuit is used by the Jones company. This will enable the administrator to make any necessary repair arrangements which will best accommodate the client Jones.

As can be seen, the present invention and its equivalents are well-adapted to provide a new and useful method of trending the functionality of circuits in equipment. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out order described.

The invention claimed is:

1. A method of monitoring the functionality of circuits in a circuit network comprising:
   obtaining data regarding the functionality of at least one circuit over a period of time;
   generating a historical report comprising historical information regarding the operability of said at least one circuit;
   using said historical information to predict the future operability of said at least one circuit
   attempting to access log files regarding the functionality of at least one circuit over a period of time from a database associated with a piece of equipment which includes said at least one circuit; and
   emailing a user if the attempt to access said log files through a primary IP address fails, wherein the piece of equipment and the primary IP address are identified in the email.

2. The method of claim 1, wherein said generating step includes an additional step of:
   including the historical information in a table.

3. The method of claim 2, wherein said step of including the historical information in a table comprises:
   chronologically presenting a total number of errors occurring for said at least one circuit for a series of intervals so that the user may observe trends in said errors.

4. The method of claim 2, wherein said step of including the historical information in a table comprises:
   identifying customer information with respect to said at least one circuit in said table.

5. The method of claim 2, wherein said at least one circuit is included in a piece of equipment, said step of including the historical information in a table comprises:
   matching up said at least one circuit with said piece of equipment in said table.

6. The method of claim 2, wherein said step of including the historical information in a table comprises:
   chronologically presenting a total number of errors occurring for said at least one circuit over a series of days of the week so that the user may observe trends in said errors.

7. The method of claim 6, comprising:
   selecting said series of days to be days immediately preceding a date on which the data regarding the functionality of at least one circuit is obtained and used to generate the report.

8. The method of claim 2, comprising:
   including a description of the particular errors which have occurred in the table.

9. The method of claim 1, wherein said obtaining step comprises:
   accessing log files including said data regarding the functionality of at least one circuit over a period of time from a database associated with a piece of equipment which includes said at least one circuit.

10. The method of claim 1, comprising:
    attempting to access log files regarding the functionality of at least one circuit via a secondary IP address for said equipment if the initial attempt to access said log files fails.

11. The method of claim 10, comprising:
    sending a second email to said user if the attempt to access said log files through said secondary IP address fails.

12. The method of claim 11, comprising:
    identifying the piece of equipment and the primary IP address in said second email.

13. The method of claim 1, comprising:
    emailing said report to a user so that said user may use said historical information to predict the future operability of said at least one circuit.

14. The method of claim 1, comprising:
    placing data in a database after said obtaining step.

15. The method of claim 14, comprising:
    identifying at least one data source having one or more data items;
    identifying a database to be populated; and
    without user intervention, populating said database with elements derived from dynamically performing one or more operations on said one or more data items.

16. The method of claim 15, wherein at least one of the operations is a database function to be performed with respect to one or more data items.

17. The method of claim 15, wherein performing at least one of the operations alters at least a portion of the data items in the database.

18. The method of claim 15, wherein performing at least one of the operations truncates at least a portion of the data items in the database.

19. The method of claim 15, wherein performing at least one of the operations formats at least a portion of the data items in the database.

20. The method of claim 15, further comprising creating an insertion command that incorporates said set of data to be placed in to the database and said operations.

21. The method of claim 20, further comprising providing the insertion command to said database, whereby the identified data and the operations are inputted into the database.

22. The method of claim 15, further comprising inserting at least a portion of said data items into said database, wherein said insertion instructs the database to perform said operations with respect to at least a portion of said data items.

23. The method of claim 15, further comprising populating said database with content derived from dynamically performing one or more operations.

24. The method of claim 23, wherein said content is not associated with the one or more data items.

25. One or more computer-storage media having computer-useable instructions embodied thereon to perform the method of claim 1.

26. A method of monitoring the functionality of circuitry in equipment, comprising:
- retrieving circuitry error data from the equipment for different intervals;
- delimiting the data to create a delimited data set;
- populating a data base with said delimited data set;
- generating a report using data from said populated data base, said data reflecting the error total for each interval;
- analyzing said report to determine functionality trends in said equipments and
- generating at least one of port information and customer information in XML for use in said report.

27. The method of claim 26, comprising:
- identifying said database;
- referencing said database;
- creating an insertion command that incorporates said error data to be placed in to the database, wherein said insertion command instructs the database to perform one or more operations with respect to at least a portion of said error data; and
- providing for the execution of the insertion command by said database, whereby the error data is inputted into the database, and wherein said execution includes populating said database with content derived from dynamically performing said one or more operations.

28. One or more computer-storage media having computer-useable instructions embodied thereon to perform the method of claim 26.

29. The method of claim 26, comprising:
- removing data which does not apply to selected trend time lines after said populating step.

30. The method of claim 29, comprising:
- making an SQL query to accomplish said removing step.

31. The method of claim 30, said generating step comprising:
- running a second query that generates trend data from a remaining data set which was not eliminated in said removing step.

32. The method of claim 31, comprising:
- making an SQL query to execute said second query.

33. The method of claim 26, comprising:
- placing data from said populated data base into a separate table.

34. The method of claim 33, wherein said placing step comprises:
- running an SQL query.

35. The method of claim 26, comprising:
- pulling circuit information from said delimited data set.

36. The method of claim 26, comprising:
- calling mutt to email said report to a system administrator.

37. A method of monitoring the functionality of circuitry in equipment, comprising:
- retrieving circuitry error data from the equipment for different intervals;
- delimiting the data to create a delimited data set;
- populating a data base with said delimited data set;
- generating a report using data from said populated data base, said data reflecting the error total for each interval;
- analyzing said report to determine functionality trends in said equipment; and
- calling mutt to email said report to a system administrator.

* * * * *